United States Patent [19]

Braunmiller et al.

[11] Patent Number: 4,913,515
[45] Date of Patent: Apr. 3, 1990

[54] OPTICAL CABLE ELEMENT, MULTIPLE-FIBER TUBE UNIT, AND OPTICAL CABLE

[75] Inventors: Michael Braunmiller, Stuttgart; Ferdinand Grögl, Beilstein; Thomas A. Klett, Murr, all of Fed. Rep. of Germany

[73] Assignee: Alcatel N.V., Amsterdam, Netherlands

[21] Appl. No.: 288,413

[22] Filed: Dec. 21, 1988

[30] Foreign Application Priority Data

Dec. 23, 1987 [DE] Fed. Rep. of Germany ....... 3743802

[51] Int. Cl.$^4$ .......................... G02B 6/44; H01B 7/00
[52] U.S. Cl. .................................................. 350/96.23
[58] Field of Search ...................................... 350/96.23

[56] References Cited

U.S. PATENT DOCUMENTS

| | | | |
|---|---|---|---|
| 3,883,218 | 5/1975 | Slaughter | 350/96.23 |
| 3,937,559 | 2/1976 | Ferrentino et al. | 350/96.23 |
| 4,038,489 | 7/1977 | Stenson et al. | 350/96.23 X |

OTHER PUBLICATIONS

G. Mahkle and P. Gössing, "Lichtwellenleiterkabel", Siemens, 1986, pp. 101–102.
"Lightpack Cable", Lightguide Cable Design, Data Sheet, Marketing Communications, 2122B, Aug. 1985.
AT&T Technologies, "Lightguide Cable Design", Marketing Communications, 2122B, Aug. 1985.

*Primary Examiner*—William L. Sikes
*Assistant Examiner*—Akm E. Ullah
*Attorney, Agent, or Firm*—Christie, Parker & Hale

[57] ABSTRACT

An optical cable element (5) includes several optical fibers (1) arranged concentrically around a central thread (3) and surrounded by a common envelope (4). The envelope (4) is made of a plastic which adheres to the optical fibers (1), so that after the cable element (5) has been slit open along its longitudinal axis, the round cable element is transformable into a ribbon element in the slit area, which facilitates multiple splicing. Also disclosed are a multiple-fiber tube unit and optical cables containing several such cable elements.

10 Claims, 1 Drawing Sheet

OPTICAL CABLE ELEMENT, MULTIPLE-FIBER TUBE UNIT, AND OPTICAL CABLE

TECHICAL FIELD

The present invention relates to an optical cable element having at least two optical fibers, and to multiple-fiber tube units and optical cables containing at least one such optical cable element.

CLAIM FOR PRIORITY

This application is based on and claims priority from an application first filed in Fed. Rep. Germany on 05/11/85 under serial number 3517011. To the extent such prior application may contain any additional information that might be of any assistance in the use and understanding of the invention claimed herein, it is hereby incorporated by reference.

BACKGROUND ART

Optical cables having a tube which contains several cable elements are made by AT and T (AT and T Marketing Communications 2122B, August 1985). A cable element has 4 to 12 optical fibers which are held together with a color-coded yarn binder. Two or more cable elements and a tube which loosely surrounds the cable elements form a multiple-fiber tube unit, which is filled with a filling compound. A tensionproof cable jacket is applied directly over the multiple-fiber tube unit.

Such combinations of optical fibers into cable elements permit high fiber-packing densities but require special attention during splicing, so that the fibers of the different cable elements will not be mixed up. In the cables described above, an assignment of an individual optical fiber to a particular cable element at a cable end is hardly possible because during removal of the tube, the binders come open and all optical fibers get into disorder.

DISCLOSURE OF INVENTION

It is the object of the present invention to provide an optical cable on which multiple-fiber splicing can be performed in a simple manner.

In accordance with the invention, a plastic envelope adheres to the concentrically arranged optical fibers, so that after the round cable element has been slit open, it is transformmed into a ribbon element.

The invention has the advantage that by ripping open the plastic envelope with the aid of a rip filament, the round cable element is transformed into a ribbon cable element, which permits multiple splicing. Furthermore, the optical fibers need not be colored, since each optical fiber can be identified by its position on the ribbon.

BRIEF DESCRIPTION OF DRAWINGS

Embodiments of the invention will now be explained with reference to the accompanying drawing, in which.

BEST MODE FOR CARRYING OUT THE INVENTION

Figure 1:
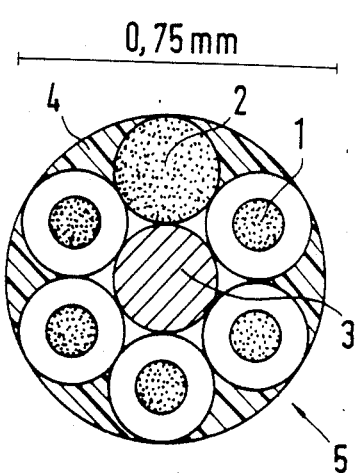
FIG. 1 shows an optical cable element with five optical fibers and a rip filament.

In FIG. 1, a first optical cable element 5 has five optical fibers 1 and a rip filament 2, which are arranged concentrically about a central thread 3. An envelope 4 of plastic is applied over the optical fibers 1 and the rip filament 2.

Figure 2:
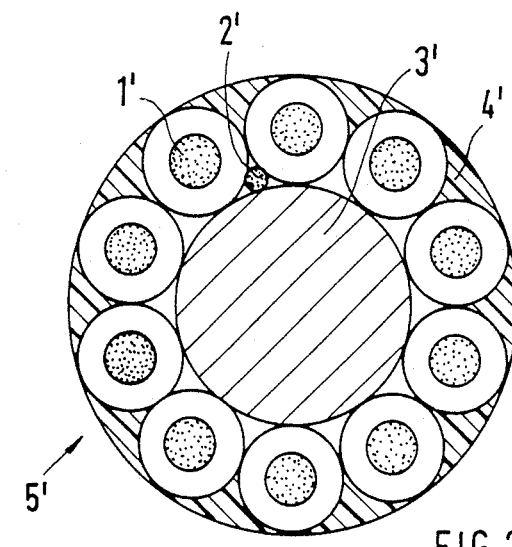
FIG. 2 shows an optical cable element with ten optical fibers and a rip filament.

In FIG. 2, a second optical cable element 5' has ten optical fibers 1', which are arranged concentrically around the central thread 3'. The rip filament 2' is contained in an interstice between two optical fibers 1' and the central thread 3'. The envelope 4' of plastic is applied over the optical fibers 1'. In another embodiment, the rip filament is disposed directly under the envelope between two optical fibers.

Figure 3:
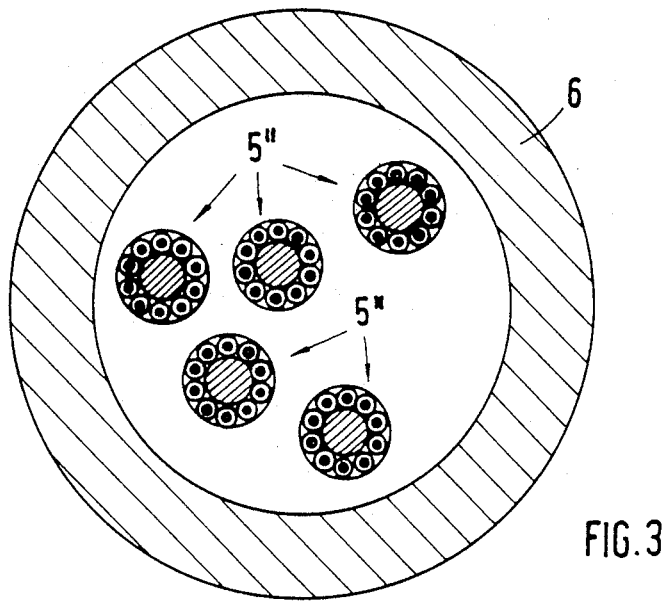
FIG. 3 shows a multiple-fiber tube unit with five optical cable elements.
Further embodiments are described in the following description.

FIG. 3 shows a multiple-fiber tube unit consisting of a tube 6 and five optical cable elements 5''. The latter differ from the element described with the aid of FIG. 2 only in that they contain no rip filament. Since, in the absence of the rip filament, the point at which the cable element 5'' will be opened is no longer predeterminable, the fibers can no longer be identified by their positions on the ribbon but must be colored differently. The cable elements 5'' are loosely surrounded by the tube 6. The interior of the tube 6 may be filled with a filling compound.

In the optical cable elements described above, the central thread 3, 3' is preferably made of glass-fiber-reinforced plastic. To seal the cable against the lengthwise passage of water, the central thread may be coated with a gelatinous compound. The thickness of the coating and, thus, the quantity of the gelatinous compound are chosen so that the interstices between the optical fibers and the central thread are filled. The central threads of different cable elements may be colored differently.

The rip filament 2, 2' is a glass or aramid fiber.

The envelope 4, 4' is made of a thermoplastic elastomer (such as "Pebax" of ATO Chemicals), a room-temperature-vulcanizing silicone rubber (such as "Sylgard" of Dow Corning), a UV-vulcanizable polymer (such as a polyurethane acrylate), or a soft thermoplastic (such as a polyethylene copolymer).

All above-mentioned materials for the envelope 4, 4' are chosen so that the optical fibers 1, 1' adhere to the envelope, so that even after the envelope has been ripped open with the aid of the rip filament, the optical fibers will not get into disorder, but that the round cable element 5, 5', 5'' will be transformed into a ribbon element.

The above-described multiple-fiber tube units can be used in optical cables of virtually any construction and with high fiber-packing densities. For example, a tensionproof cable jacket may be applied directly over a tube. It is also possible to arrange two or more tubes around a tensionproof central member and cover them with a cable jacket, which then needs not be tensionproof.

We claim:
1. A round optical cable element having a longitudinal axis and comprising
   a central filament,
   two or more optical fibers arranged concentrically around the central filament, the fibers and the central filament being oriented in the direction of the longitudinal axis, means for ripping open the envelope in the longitudinal direction of the cable at a predetermined position about the circumference between a predetermined adjacent pair of said optical fibers, and an envelope of plastic applied over and adhering to the optical fibers, whereby a portion of the cable element may be ripped open along its longitudinal axis and the round cable element may be transformed into a ribbon cable element in the vicinity of the thus ripped open portion.

2. An optical cable element as claimed in claim 1, wherein the envelope is made of a thermoplastic elastomer, a soft thermoplastic, or a thermally vulcanizable or UV-vulcanizable polymer.

3. An optical cable element as claimed in claim 2, wherein the envelope is made of a polyether block amide, a polyurethane, a polyolefin elastomer, a silicone rubber, or an acrylic resin.

4. An optical cable element as claimed in claim 1, wherein the interstices between the optical fibers and the central filament are filled with a filling compound.

5. An optical cable element as claimed in claim 11, wherein said rip filament has essentially the same diameter as said optical fibers and is also arranged concentrically about the central filament together with said optical fibers.

6. An optical cable element as claimed in claim 11, wherein the rip filament has a considerably smaller diameter than that of the optical fibers.

7. An optical cable element as claimed in claim 11, wherein the rip filament is a glass or aramid fiber.

8. A multiple-fiber tube unit comprising at least one optical cable element as claimed in claim 1.

9. An optical cable comprising at least two multiple-fiber tube units as claimed in claim 8, wherein said at least two multiple-fiber tube units are arranged concentrically around a central member.

10. An optical cable element as claimed in claim 1, wherein said means for ripping open further comprises a rip filament parallel to said longitudinal axis for slitting the cable element in the direction of said axis.

* * * * *